(12) United States Patent
Siess

(10) Patent No.: US 6,512,366 B2
(45) Date of Patent: Jan. 28, 2003

(54) ROTARY POSITION TRANSMITTER FOR REGISTERING A ROTARY POSITION

(75) Inventor: Rainer Siess, Erlangen (DE)

(73) Assignee: Siemens Aktiengesellschaft (DE)

(*) Notice: Subject to any disclaimer, the term of this patent is extended or adjusted under 35 U.S.C. 154(b) by 0 days.

(21) Appl. No.: 09/848,683

(22) Filed: May 3, 2001

(65) Prior Publication Data

US 2002/0053902 A1 May 9, 2002

(30) Foreign Application Priority Data

Nov. 3, 2000 (DE) .................................. 100 544 70.3

(51) Int. Cl.$^7$ ................................................ G01B 7/30
(52) U.S. Cl. ........................ 324/207.25; 324/207.13; 324/207.15; 359/144
(58) Field of Search ................................. 702/151, 167; 324/207.13, 207.14, 207.15, 207.23, 207.24, 207.25; 358/909.1; 310/105, 95; 348/335; 137/625.27, 625.5; 180/197, 249, 446; 701/41

(56) References Cited

U.S. PATENT DOCUMENTS

| | | | | |
|---|---|---|---|---|
| 4,962,495 A | * | 10/1990 | Gibbons et al. | ............ 359/144 |
| 5,565,769 A | * | 10/1996 | Mehnert et al. | ........ 324/207.15 |
| 5,714,769 A | * | 2/1998 | Mehnert et al. | ........ 324/207.15 |
| 5,714,882 A | | 2/1998 | Mehnert et al. | ........ 324/207.15 |
| 6,084,400 A | * | 7/2000 | Steinich et al. | ........ 324/207.13 |
| 6,104,185 A | | 8/2000 | Lamm et al. | ............ 324/207.2 |

FOREIGN PATENT DOCUMENTS

| | | |
|---|---|---|
| DE | 3903359 | 8/1990 |
| DE | 4407474 | 3/1994 |
| DE | 4342069 | 6/1995 |
| DE | 4413281 | 10/1995 |
| EP | 0658745 | 6/1995 |

* cited by examiner

Primary Examiner—John S. Hilten
Assistant Examiner—John Le
(74) Attorney, Agent, or Firm—Baker Botts LLP

(57) ABSTRACT

A rotary position of a rotary element is registered by a sensor arrangement having at least two sensors and an evaluation circuit disposed downstream thereof. In each position of the rotary element, the sensors are capable of supply raw signals by which it is possible to determine which angular range the rotary element has rotated. A power generation system outputs power pulses to the sensor arrangement sufficiently frequently so that, by using the registered angular ranges, detection of the direction of rotation of the rotary element is possible.

17 Claims, 5 Drawing Sheets

ROTARY POSITION TRANSMITTER FOR REGISTERING A ROTARY POSITION

FIELD OF THE INVENTION

The present invention relates to a rotary position transmitter for registering a rotary position of a rotary element that can rotate about an axis of rotation, where the rotary position transmitter has a sensor arrangement with at least two sensors and an evaluation circuit which is disposed downstream of the sensors and by means of which the rotary position of the rotary element relative to a reference position of the rotary element can be registered, where the sensors are capable of supplying raw signals, where, at least in the case of a slow rotary movement, power pulses are output forcibly to the sensor arrangement by a first power generation system, on the basis of which pulses it is possible to operate the sensor arrangement in each case until it is possible to determine the rotary position of the rotary element by which the rotary element has rotated in relation to the reference position when the power pulse is output, where the first power generation system and the rotary element are coupled to each other.

A rotary position transmitter of this type is disclosed by EP 0 658 745 B 1.

In the aforementioned prior art, the first power generation system is identical with the sensor arrangement. The first power generation system is always activated when the rotary element reaches a predetermined position relative to the sensor arrangement. Between these positions, no registration of the rotary position is possible. This applies even when the sensor arrangement is supplied with electrical power from outside, for example via an external power source. In addition, in the case of the aforementioned prior art, the raw signals are generated for only a short time. It is therefore possible to detect only the reaching of the predetermined position. It is not possible to register whether the rotary element then remains in this position or continues to move.

The procedure of the prior art has a number of disadvantages. The most important disadvantages consist in the fact that, firstly, only changes in the rotary position can be registered, but not rotary positions as such, and that, secondly, in the case of faster rotary movements, it is necessary to change over to a different evaluation method, since the first power generation system, which is identical with the sensor arrangement, no longer operates reliably during faster rotary movements. Furthermore, in the known prior art, either the direction of rotation can be determined only by means of a complicated evaluation of the chronological sequence of the raw signals generated when the predetermined position is reached, or a complex system is needed, on whose reliability in continuous operation limits are set.

The object of the present invention is to provide a rotary position transmitter in which reliable determination of the rotary position and of the direction of rotation of the rotary element is possible in a simple way.

The object is achieved by a rotary position transmitter which has a sensor arrangement with at least two sensors and an evaluation circuit which is disposed downstream of the sensors and by means of which a rotary position of the rotary element relative to a reference position of the rotary element can be registered, where, in each possible rotary position of the rotary element, the sensors are capable of simultaneously supplying raw signals using which it is possible to determine by which of a number of angular ranges the rotary element has been rotated relative to the reference position, where, at least in the case of a slow rotary movement, power pulses are output forcibly to the sensor arrangement by a first power generation system, on the basis of which pulses it is possible to operate the sensor arrangement in each case until it is possible to determine the angular range by which the rotary element has been rotated relative to the reference position when a power pulse is output, where the first power generation system and the rotary element are coupled to each other in such a way that, by using two angular ranges which are determined solely by using the raw signals when immediately successive power pulses are output, unequivocal detection of the direction of rotation of the rotary element is possible.

The decisive advantage of the rotary position transmitter according to the invention consists in the fact that, in this regard, the sensor arrangement and the first power generation system are decoupled from each other. This is because the sensor arrangement can consequently be configured independently of the first power generation system. In particular, this means that the number of power pulses forcibly output by the first power generation system can be defined independently of the configuration of the sensor arrangement, in such a way that unequivocal detection of the direction of rotation of the rotary element is always possible.

Furthermore, because of the evaluation of the raw signals, which can be supplied simultaneously in every possible rotary position, it is always possible to determine the rotary position of the rotary element irrespective of the manner in which the sensor arrangement is supplied with power, solely by using the raw signals supplied simultaneously at one instant. This is particularly advantageous since the first power generation system outputs the forcible power pulses to the sensor arrangement with certainty only up to a limiting rotary speed. Above the limiting rotary speed, supplying the sensor arrangement with electrical power by means of the first power generation system can therefore no longer be ensured.

In order to ensure that the sensor arrangement is supplied with electrical power above this limiting rotary speed as well, the rotary position transmitter therefore generally has a second power generation system, which is coupled to the rotary element in such a way that it supplies energy continuously to the sensor arrangement, at the latest beginning at this limiting rotary speed. Beginning at the limiting rotary speed, therefore, the second power generation system undertakes the supply of power to the sensor arrangement. In addition, it is also possible for the rotary position transmitter to have supply connections, by means of which the sensor arrangement can be supplied with power from outside. In this case, changing the evaluation method during a rotary speed change, or a change to the power supply method, is not necessary.

The raw signals are preferably binary or ternary. If the raw signals are binary signals, the angular ranges are preferably equally large. If the raw signals are ternary, the angular ranges comprise basic angular ranges and intermediate angular ranges alternatingly, the basic angular ranges being larger than the intermediate angular ranges. The basic angular ranges and the intermediate angular ranges are then again equally large among themselves.

If the evaluation circuit is constructed in such a way that it checks the raw signals supplied by the sensors for plausibility and, if implausibility exists, outputs an error signal, the evaluation circuit operates particularly reliably.

If the sensors are magnetic field sensors, in particular Hall sensors, and the rotary element has a magnetic signature with at least two signature regions, the sensor arrangement needs particularly little power for operation.

The signature regions can optionally be magnetized radially or axially with respect to the axis of rotation. However, they should be equally large among themselves.

If the first power generation system and the rotary element are coupled to each other via coupling magnets, the rotary position transmitter operates particularly reliably. The coupling magnets can optionally be magnetized radially or tangentially. In this case, the coupling is particularly strong if the coupling magnets are magnetized tangentially.

The more frequently the first power generation system outputs a power pulse, the more accurately can the angular range be resolved. However, it is adequate for the first power generation system and the rotary element to be coupled to each other in such a way that the rotary element changes its rotary position by a maximum of 120° between two immediately successive power pulses.

If the sensor arrangement can be operated in a cyclic manner in order to register and evaluate the raw signals, the result is a particularly low power requirement for the sensor arrangement. If no continuous power supply is provided, the sensors are therefore supplied with power for only a short time in each case. As a result, the energy consumption of the sensors is reduced. The sensors are thus operated in a cyclic manner at specific time intervals and in each case for a short, defined time. The important factor here is, inter alia, that the sensors are operated in a cyclic manner synchronously with each other.

If, on the other hand, a continuous power supply to the sensor arrangement is provided, the sensors are operated in continuous operation. A changeover to cyclic operation is only made if the continuous power supply fails.

It is usual for the evaluation circuit to have a revolution counter disposed downstream, by means of which a number of revolutions of the rotary element can be determined.

If the revolution counter can be supplied with power together with the sensor arrangement, the revolution counter has an electrically erasable and writable read-only memory, and the counter reading and the angular range determined during the output of the power pulses to the sensor arrangement are stored in the read-only memory during the respective power pulse, it is ensured that the current state of revolution is always known and can be registered, irrespective of the manner in which the sensor arrangement is supplied with electrical power.

Further advantages and details emerge from the following description of an exemplary embodiment in conjunction with the drawings, in which, in a basic representation:

Figure 1:
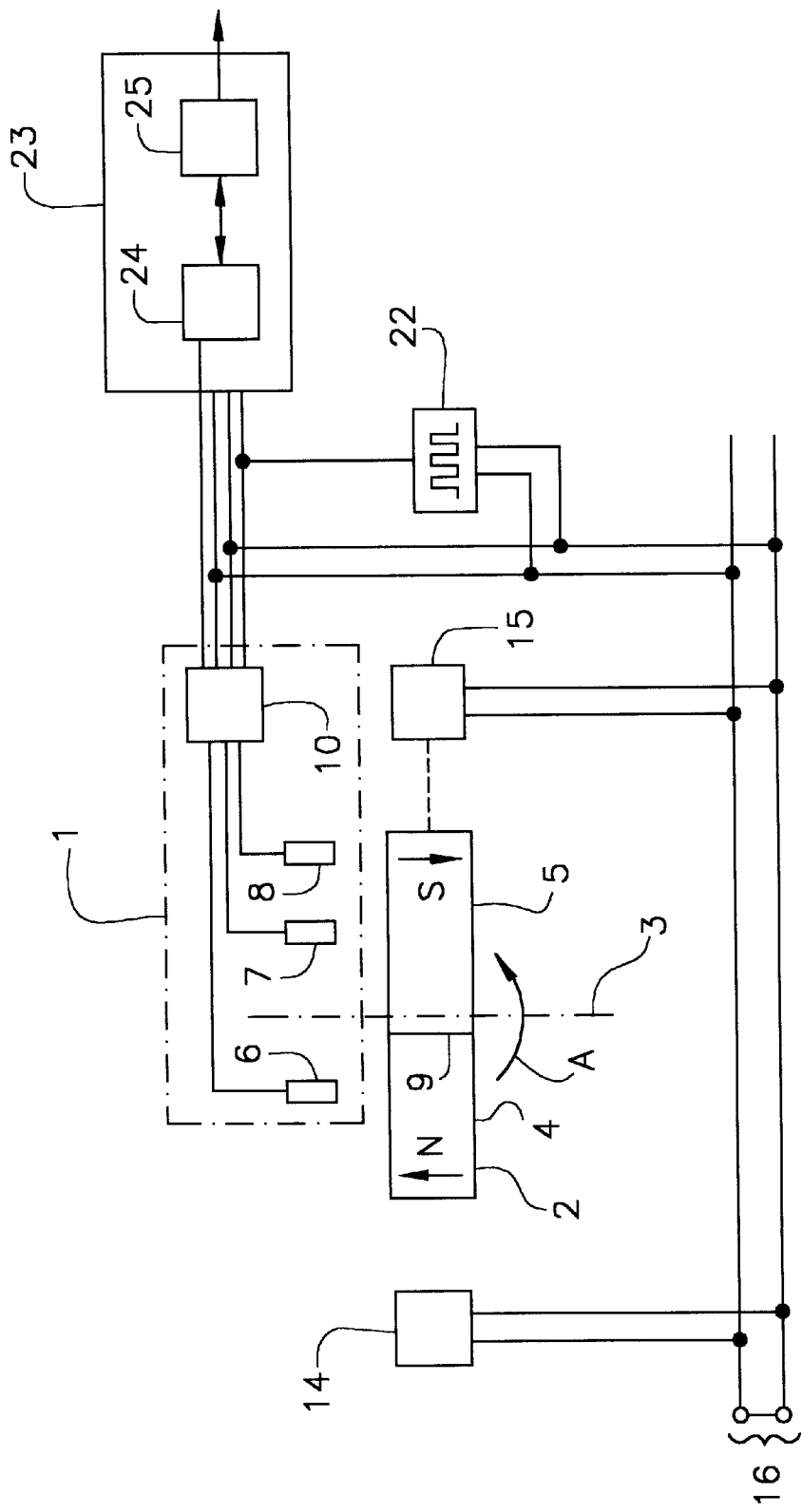
FIG. 1 shows a block diagram of a rotary position transmitter.

According to FIG. 1, a rotary position transmitter has a stationary sensor arrangement 1 and a rotary element 2. The rotary element 2 can rotate about an axis of rotation 3, as indicated in FIG. 1 by an arrow A.

The sensor arrangement 1 has three sensors 6–8. The sensors 6–8 are constructed as magnetic field sensors 6–8, preferably as Hall sensors 6–8. As can be seen from FIG. 2, the three sensors 6–8 are arranged so as to be offset by an angle from one another with respect to the axis of rotation 3. The relative angles $\alpha$, $\beta$ are preferably chosen in such a way that they are equal to 180° divided by the number of sensors 6–8. In the present case, the relative angles $\alpha$, $\beta$ are therefore 60°.

The rotary element 2 has two signature regions 4, 5. The signature regions 4, 5 are equally large among themselves and magnetized in opposite directions. They extend in each case over 180°. They are separated from one another by a small transition region 9. As indicated by the letters N and S in FIGS. 1 and 2, either the magnetic north pole N or the magnetic south pole S therefore faces the sensors 6–8 in each case, depending on the signature region 4, 5.

Figure 2:
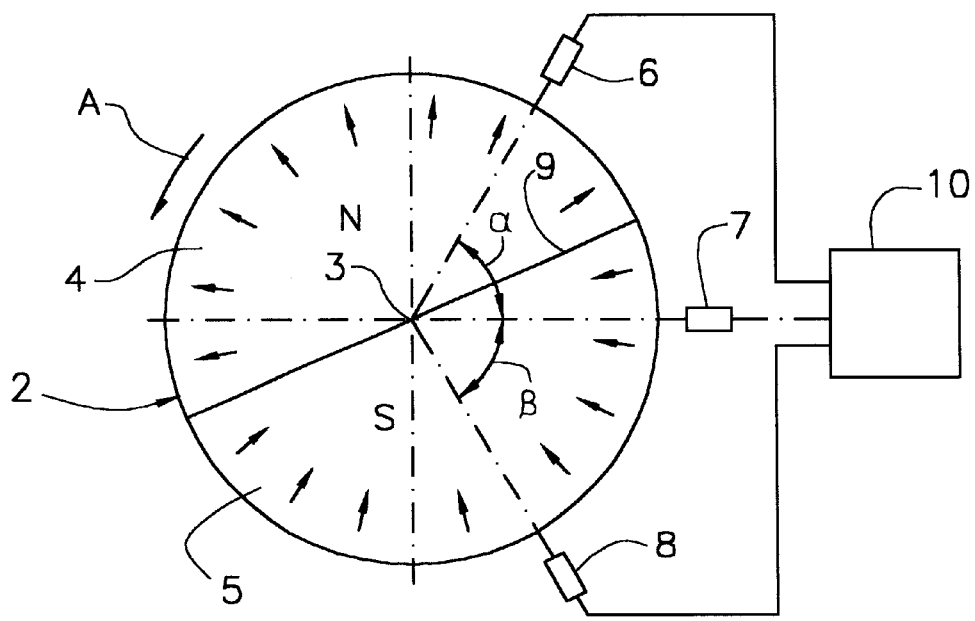
FIG. 2 shows a sensor arrangement with a rotary element.

According to FIG. 1, the sensors 6–8 are disposed above the rotary element 2, and beside the rotary element 2 according to FIG. 2. Corresponding to this, the signature regions 4, 5 are magnetized axially with respect to the axis of rotation 3 in the illustration according to FIG. 1, and are magnetized radially in the illustration according to FIG. 2. In the case of axial magnetization, the sensors 6–8 could also be disposed underneath the rotary element 2.

By means of the sensors 6–8, a rotary position of the rotary element 2 relative to a reference position of the rotary element 2 can be registered. In this case, the reference position is arbitrarily defined to mean that the transition region 9 between the two signature regions 4, 5 points exactly to the central one of the sensor elements 6–8, and the sensor element 6 registers the presence of the signature region 4.

On the basis of the construction of the rotary element 2 with two signature regions 4, 5 which each extend over 180°, in every possible rotary position of the rotary element 2, the sensors 6–8 are capable of simultaneously supplying raw signals which can be evaluated practically. In this case, the raw signals are preferably binary or ternary. They are supplied to an evaluation circuit 10 which is disposed downstream of the sensors 6–8 and then uses the raw signals supplied to determine an angular range 11–13 by which the rotary element 2 has been rotated relative to the reference position.

Figure 3:
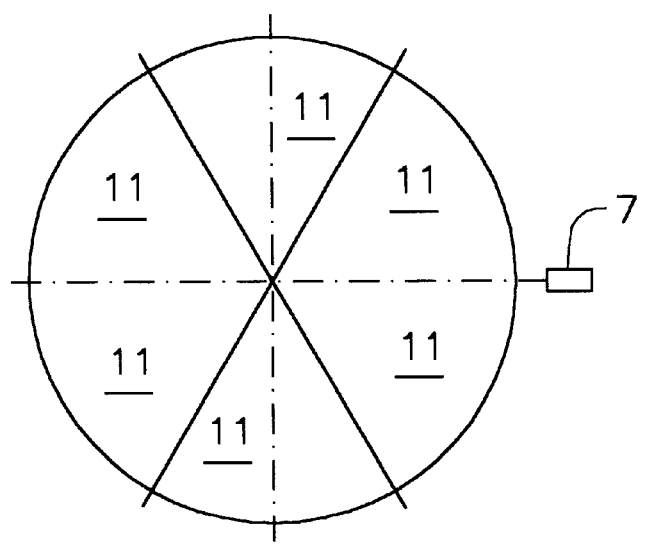
FIG. 3 shows an angular range distribution.

If the raw signals are binary signals, they register either unequivocally the presence of one of the two signature regions 4 and 5, or they do not register the presence of this signature region 4 or 5. It is then possible to determine, on the basis of the raw signals, by which of a number of substantially equally large angular ranges 11 the rotary element 2 has been rotated relative to the reference position. The angular ranges 11 are illustrated in FIG. 3. They extend from 0° to 60°, from 60° to 120° and so on.

Figure 4:
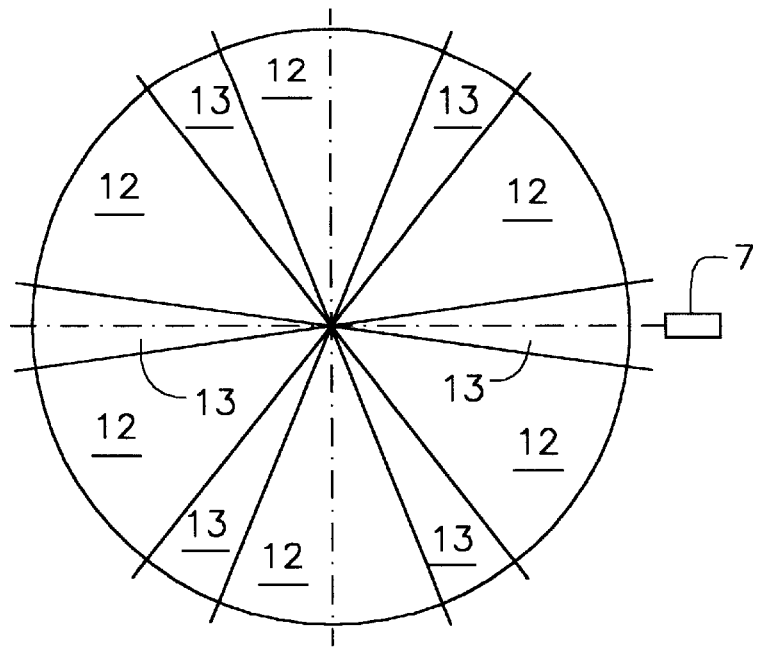
FIG. 4 shows a further angular range distribution.

If the sensors 6–8 supply ternary raw signals, they register either unequivocally the presence of one of the two signature regions 4, 5 or the presence of the transition region 9. In this case, on the basis of the raw signals, a complete circle is subdivided alternatingly into basic angular ranges 12 and intermediate angular ranges 13. The basic angular ranges 12 and the intermediate angular ranges 13 are equally large among themselves. In addition, the basic angular ranges 12 are generally larger than the intermediate angular ranges 13. For example, the intermediate angular ranges 13 are 15°, while the basic angular ranges 12 are 45°. The basic and intermediate angular ranges 12, 13 are represented schematically in FIG. 4. In this case, the basic angular ranges 12 are determined by the fact that all three sensors 6–8 detect the presence of one of the signature regions 4, 5, and the intermediate angular ranges 13 are determined by the fact that one of the sensors 6–8 registers the transition region 9.

In order to supply the sensor arrangement 1 with electrical power, the rotary position transmitter has a first and a second power generation system 14, 15 and supply connections 16. Via the supply connections 16, electrical power can be supplied to the sensor arrangement 1 from outside. If this is done, the sensor arrangement 1 is operated permanently.

The second power generation system 15 is constructed as a conventional induction coil, possibly with a rectifier and voltage regulator connected downstream. In the second power generation system 15, a voltage is induced via a rotatable magnet and is then supplied to the sensor arrangement 1. In this case, the rotatable magnet 1 can be identical to the rotary element 2, as illustrated in FIG. 1. However, use can also be made of a different magnet coupled directly or indirectly to the rotary element 2.

The second power generation system 15 is designed and coupled to the rotary element 2 in such a way that, at the latest beginning at a limiting rotary speed, it outputs a sufficient amount of power to supply the sensor arrangement 1 continuously with electrical power. On the other hand, this is not ensured below the limiting rotary speed. In order to be able to register a rotary movement of the rotary element 2 with certainty even below this limiting rotary speed, that is to say in the event of slow rotary movements, the first power generation system 14 is provided. It is illustrated schematically in FIG. 5.

Figure 6:
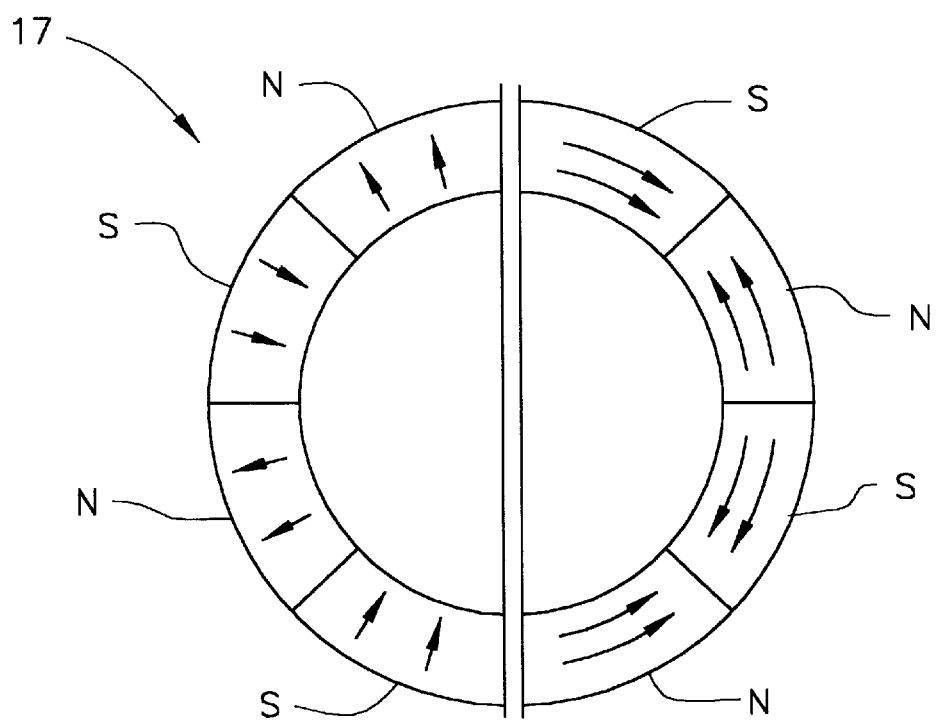
FIG. 6 shows a coupling magnet.
Figure 5:
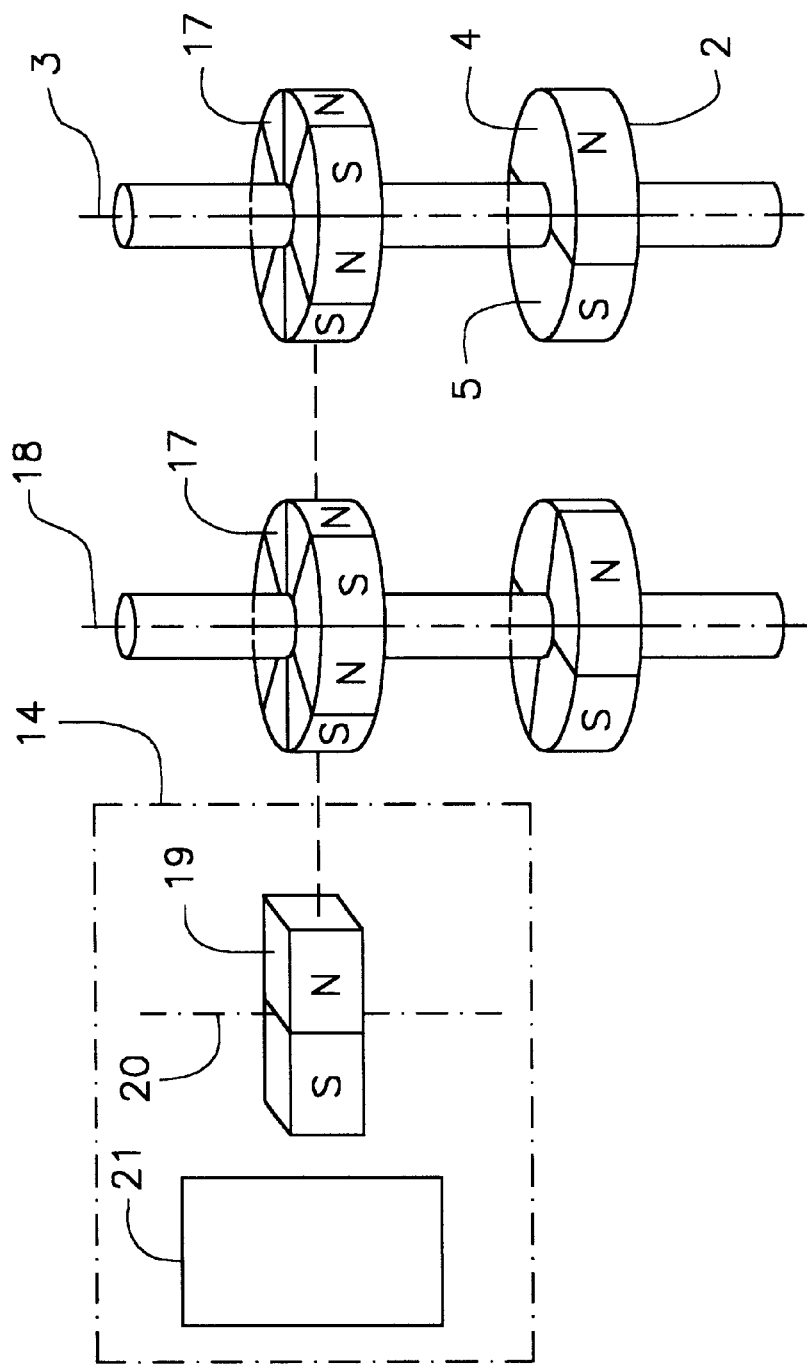
FIG. 5 shows a first power generation system.

According to FIG. 5, the first power generation system 14 has coupling magnets 17. One of the coupling magnets 17 is firmly connected to the rotary element 2 so as to rotate with it, and the other coupling magnet 17 is rotatably mounted on an intermediate axis 18 running coaxially with the axis of rotation 3. The coupling magnets 17 are magnetized either radially, as shown in the left-hand half of FIG. 6, or are preferably magnetized tangentially, as shown in the right-hand half of FIG. 6. In this case, the coupling magnets 17 have at least six signature regions, for example twelve signature regions or, as shown in FIGS. 5 and 6, eight signature regions. The first power generation system 14 is coupled to the rotary element 2 via the coupling magnets 17.

The coupling magnet 17 that is rotatably mounted on the intermediate axis 18 acts on an induction magnet 19, which is preferably constructed as a magnetic dipole 19 and is rotatably mounted with respect to a dipole axis 20. The dipole axis 20 is also oriented parallel to the axis of rotation 3. The magnetic dipole 19 is operatively connected to an induction coil 21.

In order to explain the functioning of the first power generation system 14, it will be assumed below that the magnetic dipole 19 is oriented as shown in FIG. 5. Its north pole is therefore oriented toward the left-hand coupling magnet 17. If, then, the left-hand coupling magnet 17 is rotated, because of the rotation of the rotary element 2 and, associated with this, of the right-hand coupling magnet 17, a north pole of the left-hand coupling magnet 17 approaches the magnetic dipole 19. In the process, the magnetic dipole 19 will initially be held in its position by a retaining force of a soft-iron core associated with the induction coil 21. At a specific instant, the repelling forces between the north poles of the magnetic dipole 19 and the opposite north pole of the left-hand coupling magnet 17 will become so great, however, that the magnetic dipole reverses.

This reversal of the magnetic dipole 19 occurs abruptly even at a still very slow rotary movement of the rotary element 2. As a result, a voltage pulse is generated in the induction coil 21, and is output to the sensor arrangement 1 as a forcible power pulse. Because of this power pulse, the sensor arrangement 1 can then be operated for such a time that the raw signals are registered by the sensors 6–8 and can be transmitted to the evaluation circuit 10. Because of the power pulse, the evaluation circuit 10 is, moreover, capable of using the raw signals to determine the angular range 11–13 by which the rotary element 2 has rotated relative to the reference position when this power pulse was output.

In theory, the first power generation system 14 is designed in such a way that the magnetic dipole 19 remains rotated through 180° following the abrupt reversal, that is to say, therefore, that its south pole now faces the left-hand coupling magnet 17. In practice, however, this is not always ensured. In practice, it also occurs that the magnetic dipole 19 executes a full revolution, that is to say the north pole again faces the left-hand coupling magnet 17.

For this reason, at least the right-hand one of the coupling magnets 17 has at least six signature regions. This is because, as a rule, reversal of the magnetic dipole 19 then follows a rotation of the rotary element 2 through 60°. However, even if the magnetic dipole 19 executes a full revolution during the reversal, the rotary element 2 changes its rotary position by a maximum of 120° between two immediately successive power pulses. In the case of eight or twelve signature regions, accordingly there will generally be a power pulse output every 45° or 30°, but at the latest after 90° or 60°, respectively. In all the cases listed above, the first power generation system 14 and the rotary element 2 are therefore coupled to each other in such a way that, by using two angular ranges 11–13 which are determined solely by using the raw signals that can be registered simultaneously when immediately successive power pulses are output, unequivocal detection of the direction of rotation of the rotary element 2 is possible.

The first power generation system 14 is designed in such a way that it outputs the forcible power pulses reliably at least up to the limiting rotary speed, beginning at which the power supply to the sensor arrangement 1 is ensured by the second power generation system 15. The power supply to the sensor arrangement 1 is therefore adequately ensured at any rotational speed.

As explained above, the determination of the angular range 11–13 is possible on the basis of static raw signals supplied simultaneously at an instant. This determination of the rotary position of the rotary element 2 can therefore always be carried out, that is to say irrespective of the manner in which the sensor arrangement 1 is supplied with electrical power.

According to FIG. 1, the rotary position transmitter has a clock generator 22. The clock generator 22 is likewise supplied with power. Its output clock is supplied to the sensor arrangement 1. The sensor arrangement 1 can therefore be operated in a cyclic manner in order to register and evaluate the raw signals. This is particularly advantageous if the power consumption must be minimized, since only the power pulses from the first power generation system 14 are available. However, in the event of supply being provided by the second power generation system 15, or in the case of an external power supply, this mode of operation is also advantageous.

A revolution counter 23 is disposed downstream of the evaluation circuit 10. By means of the revolution counter 23, a direction of rotation of the rotary element 2 can be detected in a known way by using two successive registered rotary positions of the rotary element 2. In this case, the rotary position of the rotary element 2 is provided by the angular range 11–13 determined. The registered direction of rotation and the rotary position can then be used to determine a number of revolutions of the rotary element 2. This determination is generally known, so that this determination is not described in detail in the following text. However, it is important that the revolution counter 23 can be supplied with electrical power together with the sensor arrangement 1. It is therefore operated jointly with the sensor arrangement 1.

Internally, the revolution counter 23 has a processing circuit 24 and a read-only memory 25. In this case, the read-only memory 25 is constructed as an electrically erasable and writable read-only memory 25.

In the read-only memory 25, the old rotary position of the rotary element 2 and a revolution reading are stored. When a new rotary position is fed in (which implicitly assumes that the revolution counter 23 is supplied with electrical power), the old rotary position and the revolution reading from the read-only memory 25 are read into the processing circuit 24. The direction of rotation is then determined from the new rotary position, which is transmitted from the sensor arrangement 1, and the old rotary position, and the revolution reading is updated, if necessary.

The processing circuit 24 stores the new rotary position of the rotary element 2 and, if appropriate, an updated revolution reading, likewise in the read-only memory 25. Both the determination of the updated values and the storage in the read-only memory 25 are, if necessary, carried out during the respective power pulse. The values can then be output to the outside from the read-only memory 25.

Figure 7:
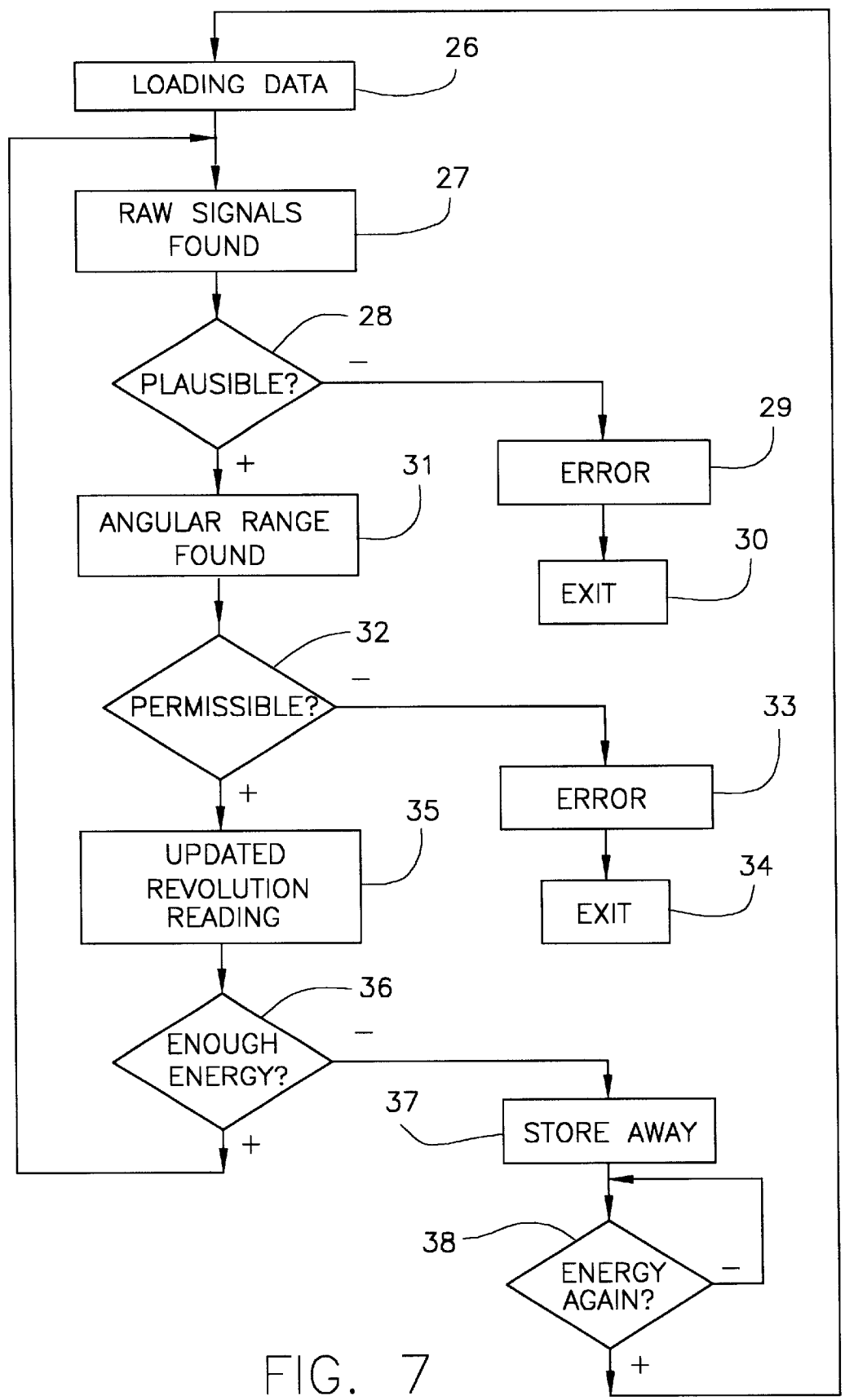
FIG. 7 shows a flow chart.

According to FIG. 7, the procedure for determining the rotary position and for updating the revolution reading is as follows:

Firstly, in a step 26, the old rotary position and the old revolution reading are read out of the read-only memory 25. The raw signals are then determined in a step 27. A check is then made in a step 28 to see whether the raw signals are plausible. If, for example, the raw signals from the sensors 6 and 8 are identical, the raw signal from the central sensor 7 must also have this value. If this is not the case, an error message is output in a step 29, and further processing of the routine is stopped in a step 30.

Otherwise, in a step 31, the angular range 11–13 is determined by which the rotary element 2 has been rotated relative to the reference position. Then, in a step 32, a comparison with the angular range 11–13 determined during the previous pass is used to determine whether the angular range 11–13 which has now been determined is permissible. A check is therefore made to see whether the difference between the two angular ranges 11–13 lies within the permissible range. If this is not the case, an error message is again output in a step 33, and further processing of the routine is stopped in a step 34.

Otherwise, the revolution reading is updated in a step 35. A check is then made, in a step 36, to see whether the existing power is adequate for a renewed pass through the routine according to FIG. 7. If this is the case, a jump is made back to step 27.

Otherwise, in a step 37, the current values are stored in the read-only memory 25 and, according to a step 38, a wait is made until power is again available for operating the sensor arrangement 1. When this is the case, a jump is made back to step 26.

Of course, modifications of the principle described above are possible without departing from the basic idea of the present invention.

For example, if appropriate, both the number and arrangement of the sensors 6–8 can be varied. However, there must be at least two sensors 6–8. In addition, the sensors 6–8 can be offset in relation to one another by different relative angles α, β. In addition, the rotary element 2 can have more than two signature regions 4, 5. Finally, the right-hand coupling magnet 17 can also have more than six signatures. The example explained above having two signature regions 4, 5 belonging to the rotary element 2, three sensors 6–8 offset by 60° and at least six signatures in the right-hand coupling magnet 17 is the simplest, however.

Finally, the rotary position transmitter can be combined, in a manner known per se, with a revolution resolver which, within one revolution, permits very precise resolution of the instantaneous angle.

What is claimed is:

1. A rotary position transmitter for registering a rotary movement of a rotary element that can rotate about an axis of rotation comprising a sensor arrangement having at least two sensors and a downstream evaluation circuit by which the rotary position of the rotary element relative to a reference position of the rotary element can be registered; and wherein in each rotary position of the rotary element, the sensors are capable of supplying raw signals by which a number of angular ranges the rotary element has been rotated relative to the reference position may be determined; and further wherein in the event of slow rotary movement, power pulses are output to the sensor arrangement by a first power generation system to operate the sensor arrangement to determine an angular range by which the rotary element has been rotated relative to the reference position; and wherein the first power generation system and the rotary element are coupled to each other so that, by using two angular ranges which are determined solely by using the raw signals when immediately successive power pulses are output, the direction of rotation of the rotary element can be detected.

2. The rotary position transmitter according to claim 1, wherein the angular ranges are equally large.

3. The rotary position transmitter according to claim 1, wherein the angular ranges comprise basic angular ranges and intermediate angular ranges which alternate with respect to the rotary position of the rotary element and the basic angular ranges are larger than the intermediate angular ranges.

4. The rotary position transmitter according to claim 3, wherein the basic angular ranges and the intermediate angular ranges are equally large among themselves.

5. The rotary position transmitter according to claim 1, wherein the evaluation circuit checks the raw signals supplied by the sensors for plausibility and outputs an error signal if the signals are implausible.

6. The rotary position transmitter according to claim 1, wherein the first power generation system outputs the power pulses to the sensor arrangement at least up to a limiting rotary speed, said transmitter having a second power generation system which is coupled to the rotary element that supplies power continuously to the sensor arrangement upon the outset of the limiting rotary speed at the latest.

7. The rotary position transmitter according to claim 1, further comprising supply connections by which the sensor arrangement can be supplied with power.

8. The rotary position transmitter according to claims 6 or 7, wherein the position of the rotary element is determined solely by using the raw signals supplied simultaneously at one instant.

9. The rotary position transmitter according to claim 1, wherein the sensors are magnetic field sensors, and the rotary element has a magnetic signature with at least two signature regions.

10. The rotary position transmitter according to claim 9, wherein the signature regions are magnetized radially or axially with respect to the axis of rotation.

11. The rotary position transmitter according to claim 9, wherein the signature regions are equally large among themselves.

12. The rotary position transmitter according to claim 1, wherein the first power generation system and the rotary element are coupled to each other via coupling magnets.

13. The rotary position transmitter according to claim 12, wherein the coupling magnets are magnetized radially or tangentially.

14. The rotary position transmitter according to claim 1, wherein the first power generation system and the rotary element are coupled to each so that the rotary element alters its rotary position by a maximum of 120° between two immediately successive power pulses.

15. The rotary position transmitter according to claim 1, wherein the sensor arrangement can be operated in a cyclic manner in order to register and evaluate the raw signals.

16. The rotary position transmitter according to claim 1, wherein the evaluation circuit has a revolution counter disposed downstream thereof, for determination of the number of revolutions of the rotary element.

17. The rotary position transmitter according to claim 16, wherein the revolution counter can be supplied with power together with the sensor arrangement and the revolution counter has an electrically erasable and writable read-only memory, and wherein the counter reading and the angular range determined during the output of the power pulses to the sensor arrangement are stored in the read-only memory during the respective power pulse.

* * * * *